Feb. 3, 1959
C. H. FROBERG, JR
2,871,768
ADJUSTABLE ANGLE PLATES
Filed July 5, 1955
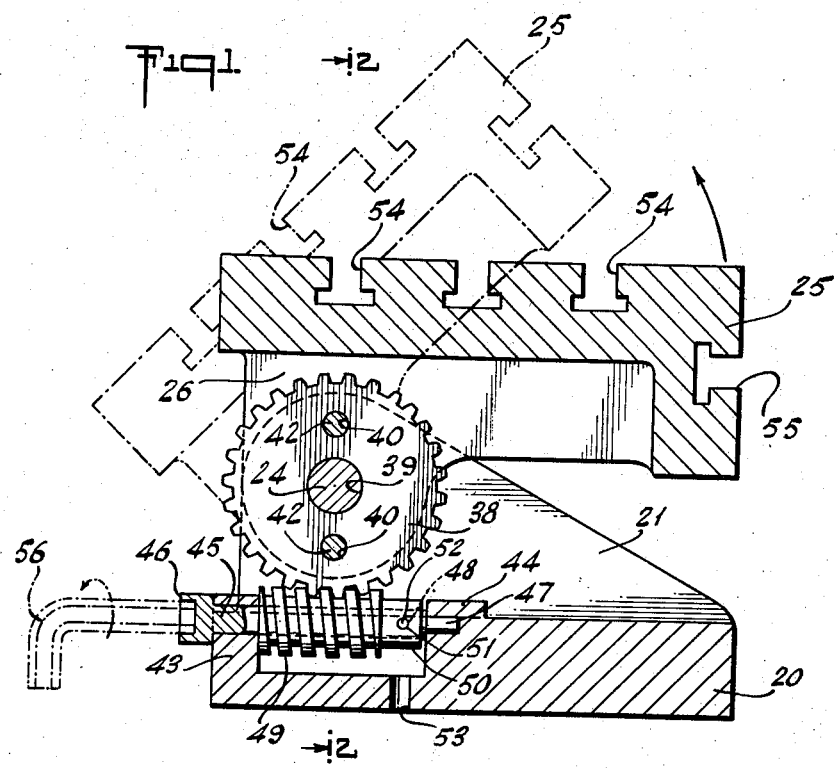
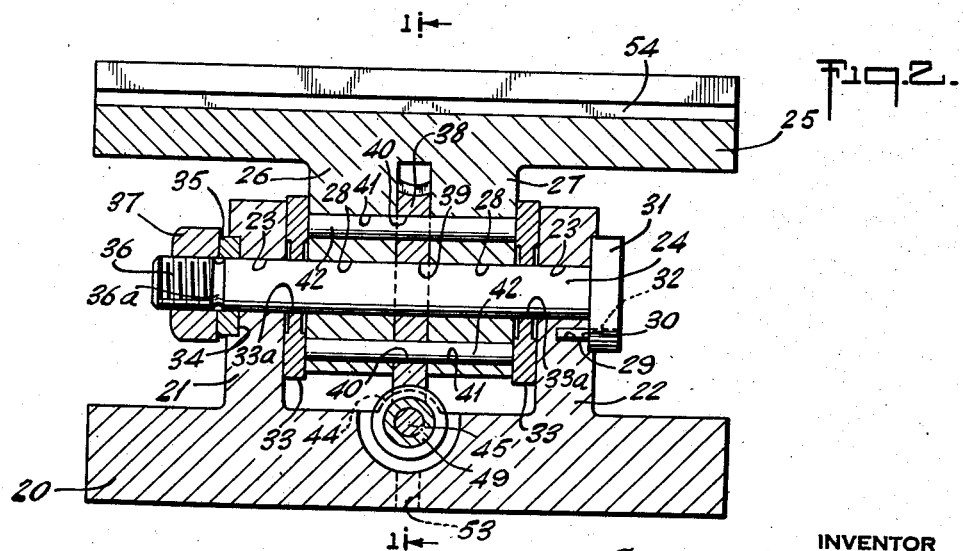
INVENTOR
CHARLES H. FROBERG JR.
BY
Charles R. Morton
ATTORNEY

United States Patent Office 2,871,768
Patented Feb. 3, 1959

2,871,768

ADJUSTABLE ANGLE PLATES

Charles Henry Froberg, Jr., Brentwood, N. Y.

Application July 5, 1955, Serial No. 519,890

3 Claims. (Cl. 90—59)

This invention relates to improvements in angle plates and more particularly to adjustable angle plates for use in conjunction with machine tools.

One object of this invention is an angle plate which can be quickly and very accurately adjusted to position the angle plate at any desired angle from below a horizontal line (minus zero degrees) to beyond a perpendicular line (plus 90 degrees) and then locked against change of angular position. Another object is to prolong the useful life of the most wear-vulnerable part of the combination. Another object is an adjustable angle plate which can be quickly assembled and disassembled. Other objects will appear from the detailed description.

In accordance with this invention the movable plate element of the combination is pivoted to rock about a removable shaft under the precise and micrometer-like control of a worm and gear to any desired angle from below the horizontal to beyond the perpendicular. The adjustment of one nut effectively locks the plate against any change of angular position on the shaft, and by removing the said nut the shaft may be removed and the plate dismounted to facilitate the rapid reversal or replacement of the wear-vulnerable gear element.

In the drawing, Fig. 1 is a cross sectional view taken along the line 1—1 of Fig. 2, looking in the direction of the arrows; and Fig. 2 is a cross sectional view taken along the line 2—2 of Fig. 1, looking in the direction of the arrows.

The bottom plate 20 has a flat stability base and is also cast with two upstanding bosses 21 and 22 which are drilled at 23, 23 to provide spaced bearings for a shaft 24 whereon the top plate 25 is mounted for angular movement from below a horizontal line position to a position which is even beyond a line perpendicular to the flat stability base of the plate 20.

Depending from the top plate 25 are a pair of spaced bosses 26, 27 which are drilled at 28, 28 to receive the shaft or axle 24. The bosses 26, 27 are spaced to fit within the opening between the bosses 21 and 22 of the bottom plate in abutment with suitable thrust washers.

The bosses 22 and 21 are spot faced, and boss 22 is drilled at 29 to receive one end of a locking pin 30. The head 31 of the axle 24 is drilled at 32 to receive the opposite end of the pin 30 which thereby locks the head 31 against turning movement of the axle 24 when the lock nut 37 is adjusted. Case hardened thrust washers 33, 33 are mounted on the axle 24 between the opposed faces of the bosses 21, 26 and 22, 27. These thrust washers are counterbored at 33a, 33a to distribute the thrust when the lock nut 37 is drawn up on the thread 36 of the axle 24. The enlarged head 31 of the axle is seated in the spot faced seat formed in the boss 22 concentric with the bearing hole 23. The boss 21 is also spot faced at 34 concentric with its bearing hole 23 to form a seat for the washer 35 positioned beneath the lock nut 37. Near its threaded end 36, the shaft 24 is undercut at 36a, to guard against risk of overstrain when the nut 36 is drawn up tight against its washer 35.

The opening between the bosses 26, 27 is sized to accommodate a standard size bronze gear. The gear 38 fits in the said opening with a push fit, and it is provided with a central opening 39 sized to receive the shaft 24 with a push fit. Two diametrically opposed holes 40, 40 spaced equidistant from the centre of the gear 38 are drilled through the gear, and holes 41, 41 are similarly drilled in the bosses 26 and 27, so that when the bronze gear 38 is sandwiched between the bosses 26 and 27 its central hole 39 can be axially aligned with the holes 28, 28 in the bosses 26 and 27, and the holes 40, 40 can likewise be aligned with the holes 41, 41 to receive the through pins 42, 42 which lock the gear 38 to the bosses 26 and 27, so that gear 38 becomes a fixed part of the unit assembly which includes the top plate 25, so that when mounted to turn upon the shaft 24, the gear 38 and the top plate 25 move together as one unit. With the holes 40, 40 and 41, 41 in correct registry, the through pins 42, 42 will enter the aligned holes with a push fit and secure all of the central openings 28, 39, 28 in axial alignment ready to receive the shaft 24.

Gear 38 is made of bronze which is tough and wears well, and as bronze is non-magnetic gear 38 will not attract and carry metal chips around with it to nick and chip the teeth of the gears. The gear 38 may be made of other hardened non-magnetic metals if desired. Because the angular motion of the top plate 25 is limited in extent, the teeth of only a sector of gear 38 are brought into mesh with the worm gear 49 and subjected to wear. However the holes 40 and 41 are all located equidistant from the axis of the shaft 24 so that either of the holes 40, 40 in the gear 38 will register with either pair of holes 41, 41 in the bosses 26, 27. Thus as the teeth of one sector of bronze gear 38 wear away, the through pins 42, 42 may be removed and the gear 38 rotated relative to the axis of the bosses 26 and 27 until the holes 40, 40 are realigned in reverse position relative to the holes 41, 41 to bring some of the previously unused teeth of another sector of circular gear 38 into position to mesh with the worm gear 49 whereupon the through pins 42, 42 may be replaced in their gear locking position. By this arrangement the useful life of the circular gear 38 is substantially prolonged.

The number of angularly spaced holes 40, 40 to be provided depends upon the length of each wear-sector of gear teeth. Where three wear-sectors of gear teeth occur, three holes 40, 40, 40, spaced 120 degrees apart should be provided.

The circular gear 38 is driven by a worm gear 49 (Fig. 1), which includes an extension collar 50 by which the gear is keyed to its drive shaft 45. Shaft 45 is journalled in a front bearing 43 and a rear bearing 44. The front end of shaft 45 is provided with a socket head 46 sized to receive a standard size socket wrench 56. At its opposite end, shaft 45 is stepped at 47 to nest in the rear bearing 44 which is fashioned in the casting of the bottom plate 20. Shaft 45 is provided with a tapered hole 48, and the collar 50 of worm gear 49 is provided with a similarly tapered hole 51 which can be aligned with the hole 48 to receive the tapered pin 52 by which the worm gear 49 is keyed to its shaft 45.

Drive hole 53 is drilled through bottom plate 20 in vertical alignment with the tapered hole 48, so that the worm gear 49 and its shaft 45 can be released by rotating the worm gear until tapered pin 52 is in an inverted position and in alignment with the drive hole 53, in which position the tapered pin 52 can be knocked out of the collar 50 by gently tapping a centre punch, or a nail set, held against the tapered end of the pin 52, with a small hammer.

The top plate 25 is provided with a plurality of T-shaped slots 54, 54 in the top face, and with a similar slot 55, in its edge face.

The socket wrench 56 may be of the T-handle type, and is turned by hand to rotate the worm gear 49 which in turn rotates the circular gear 38 to rock the top plate 25 to any desired angle within the working limits of the angle plate. Top plate 25 may be thus rocked from a position below the horizontal position shown in bold lines in Fig. 1, in the counter-clockwise direction indicated by the arrow, toward, and if desired beyond, the position shown in dot and dash lines in Fig. 1, to the extreme limit of its counter-clockwise movement which is not reached until after it has moved through and beyond the plane which is perpendicular to the plane of the flat base of the plate 20. The top plate 25 is thus capable of angular movement through an angle greater than a right angle, extending from a starting position below the horizontal plane shown in Fig. 1 to a final position which is even beyond that plane which extends perpendicularly to the plane of the flat base of the bottom plate 20.

The lock nut 37 is normally loose enough to permit easy operation of the bronze gear 38 by the worm gear 49, but after the top plate 25 has been moved to the desired angle, and the angular setting has been calibrated, the lock nut 37 may be tightened to lock the bosses 21, 26 and 22, 27 against the thrust washers 33, 33, to prevent premature change of position of the top plate 25.

The locking pin 30 prevents the shaft 24 from slipping when the lock nut 37 is turned, and the undercut 36a limits the length of the thread 36 and reduces risk of overstrain when the nut 37 is drawn against the washer 35.

As far as possible, the plates 20 and 25 are drilled and machined to accommodate standard size parts which are readily available on the open market, thereby avoiding unnecessary labor in machining special parts, and substantially reducing the cost of production of the combination.

What is claimed is:

1. In an adjustable angle plate mechanism and in combination a bottom plate having a horizontal flat stability base, a shaft, spaced bosses projecting upwardly from said bottom plate, said bosses having openings therein defining bearings for supporting said shaft in a horizontal position, an angle plate, spaced bosses depending from said angle plate, said bosses having openings formed therein sized to support said angle plate upon said shaft, a bronze gear positioned between the bosses of said angle plate, said gear having a central opening therethrough sized to receive said shaft, said gear and the bosses of said angle plate having other openings running parallel to said shaft-sized openings formed therein defining pin receiving openings which can be axially aligned by rotating said gear between said bosses with their several shaft-sized openings in axial alignment, pins passing through said axially aligned pin receiving openings to lock said gear between said bosses with their several shaft-sized openings in axial alignment, said shaft extending through said axially aligned shaft-sized openings to mount said angle plate for angular movement towards and away from said bottom plate, a hardened steel worm gear journalled in said bottom plate and meshing with said bronze gear, and said worm gear terminating in a socket head for receiving a socket wrench by which said worm gear may be operated manually to effect angular movement of said angle plate relative to said bottom plate.

2. In an adjustable angle plate and in combination a bottom plate having a flat stability base, a pair of trunnions extending upwardly from said bottom plate in parallel spaced relation to each other, a top plate having a pair of spaced bosses extending downwardly therefrom, said bosses being spaced to register between said trunnions, a toothed gear positioned between and engaging said bosses with a push fit, an axle passing through said trunnions said bosses and said gear so that said bosses and said gear may rotate about said axle as their common axis of rotation and thus impart angular movement to said top plate, each of said bosses having a plurality of radially spaced axially aligned holes formed therein extending parallel to their said axis of rotation, a plurality of similarly radially spaced axially aligned and parallel extending holes formed in said gear, said holes in said gear when axially aligned with said holes in said bosses completing a plurality of radially spaced keyways extending parallel to said common axis of rotation, said gear being rotatable between said bosses into a plurality of selective positions to complete said keyways, a plurality of pins, there being one pin to each of said keyways, said pins engaging said keyways in any gear position selected to lock said gear to and against both of said bosses, a worm gear journalled to rotate upon said bottom plate in mesh with some of the teeth of said locked gear and thus effect angular movement of said top plate relative to said bottom plate, said trunnions being operative to immobilize said pins in said keyways when said bosses are mounted between said trunnions, and said pins being removable from said keyways only after said bosses have been dismounted from between said trunnions thereby allowing said toothed gear to be rotated to another selected position and then relocked against both of said bosses so that when said bosses are remounted upon said axle between said trunnions a different group of teeth of said toothed gear will mesh with said worm gear to substantially prolong the useful life of said toothed gear.

3. In an adjustable angle plate and in combination an axle, a bottom plate having a pair of trunnions extending outwardly therefrom in spaced relation, said trunnions having coaxially aligned holes formed therein for receiving said axle, a top plate having a pair of pivot lugs extending therefrom adapted to register between said trunnions, said pivot lugs being spaced apart to leave an opening therebetween, a toothed gear positioned in said opening in engagement with the adjacent faces of said pivot lugs, said pivot lugs and said gear having coaxially aligned holes formed therein for pivotally mounting said pivot lugs and said gear upon said axle and between said trunnions to permit angular movement of said top plate relative to said bottom plate, a worm gear journalled upon said bottom plate in mesh with the teeth of said toothed gear to impart said angular movement to said top plate, a plurality of radially spaced axially disposed holes formemd through each of said pivot lugs and through said toothed gear, said holes running parallel to said axle, corresponding holes in each pivot lug being in alignment, said toothed gear being rotatable in said opening between said pivot lugs into a plurality of selective positions, the axially disposed holes in said gear being aligned with the axially disposed holes in said pivot lugs in each selective position to form keyways and to select the teeth of the toothed gear which shall mesh with the worm gear, a plurality of pins interchangeably slidably mountable in said keyways whenever formed to lock said toothed gear in said opening and to said pivot lugs in any position selected, and said trunnions and said pivot lugs cooperating to lock said pins in said pivot lugs whenever said pivot lugs with the pin-locked toothed gear positioned therebetween are pivotally mounted between said trunnions upon said axle.

References Cited in the file of this patent
UNITED STATES PATENTS

| | | |
|---|---|---|
| 1,363,222 | Beckett | Dec. 28, 1920 |
| 1,793,112 | McMahon | Feb. 17, 1931 |
| 2,329,135 | Peterson | Sept. 7, 1943 |
| 2,493,738 | Cuttat | Jan. 10, 1950 |